C. L. GARFIELD.
VENTILATORS FOR BUILDINGS.

No. 194,770. Patented Sept. 4, 1877.

Witnesses.
Harry King
F. McKenny.

Inventor:
Chas. L. Garfield.
By Hill & Ellsworth
His Atty

UNITED STATES PATENT OFFICE.

CHARLES L. GARFIELD, OF ALBANY, NEW YORK.

IMPROVEMENT IN VENTILATORS FOR BUILDINGS.

Specification forming part of Letters Patent No. 194,770, dated September 4, 1877; application filed July 26, 1877.

*To all whom it may concern:*

Be it known that I, CHARLES L. GARFIELD, of the city and county of Albany, and State of New York, have invented a new and useful Improvement in Ventilators for Buildings, Dwellings, and other Places, which improvement is set forth in the following specification and accompanying drawings, in which—

Figure 1:
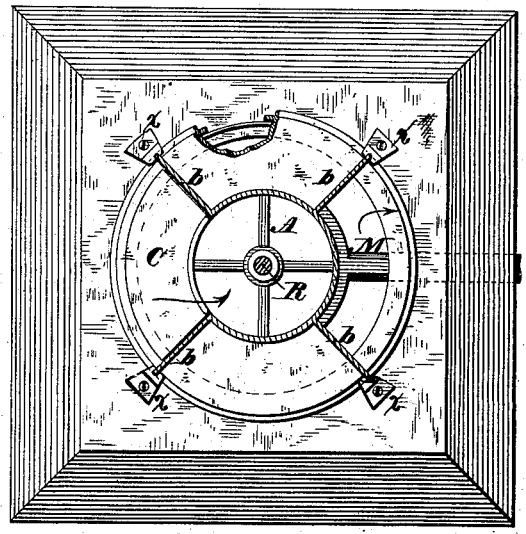
Figure 2:
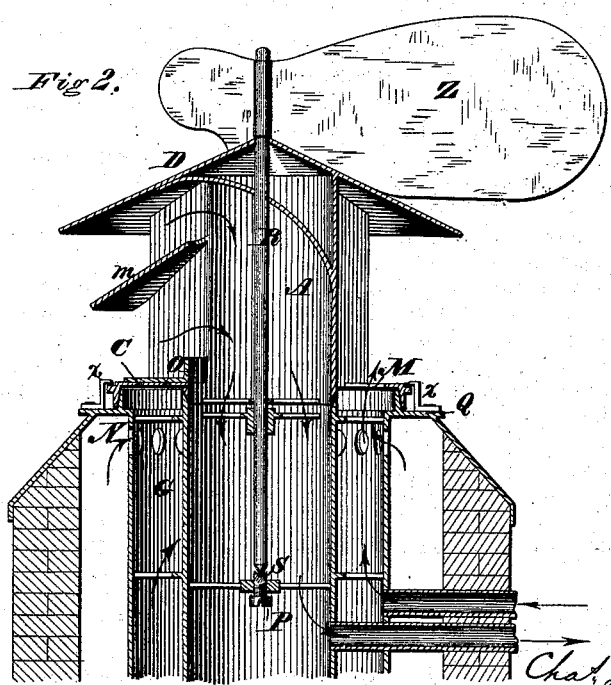

Figure 1 represents a sectional plan view, and Fig. 2 represents a vertical sectional view; showing the passages for downward and upward currents of air without impairing or unnecessarily contracting the space required for the escape of smoke in chimneys, flues, or shafts, and also showing the mode of perforating the induction and eduction passages in buildings, or wherever else it may be desirable to use my invention for the purposes hereinafter to be named.

The object of my invention is to provide the means of ventilating buildings, halls, hotels, dwellings of all kinds, factories, and other places, so as to provide abundance of fresh air, and, at the same time, to carry off the vitiated or impure air, which too frequently accumulates to the prejudice of health and comfort when people congregate at meetings in illy-ventilated halls, theaters, and other places.

My invention performs three important functions in this direction: it creates the means of accelerating drafts in chimneys and flues; it provides abundance of fresh air in dwellings and other places where fresh air is necessary, and at the same time carries off the foul air they contain.

My invention is composed of two parts, made up of several pieces, simple in construction, positive in their operations, and their disarrangement possible only under extraordinary circumstances.

The first part comprises the induction-channel or downtake-pipe A, (seen in section in Fig. 2 and in plan Fig. 1,) armed with radial wings $b$, embracing a quadrant of the circle they describe in their rotation; disk C, attached to the revolving part of the induction-pipe; top D, bars M, L-shaped stop O, all secured to each other and attached to the vertical axial rod R, pivoted on the step S, which revolves on the end of the adjustable screw P.

The downtake-pipe A may extend from the point of junction with the base piece or plate Q to the cellar or lowest places or parts of dwellings, and be perforated at any intermediary points to force a supply of fresh air where it may be desired to introduce it, as represented in Fig. 2.

The second part of my invention comprises the eduction or uptake-pipe G, surrounding the downtake-pipe A, which may likewise extend to the same depth as the pipe A in dwellings or places where it would become desirable to place my invention for the purposes named.

These two channels—the down and up take pipes—may be perforated, so as to communicate with any apartment, however remote from the chimney, flue, or shaft to which my improved ventilator may be attached, for the purposes of supplying fresh air and moving or carrying off the foul, and the supply of fresh air and removal of the foul controlled by suitable but simple contrivances attached to the apertures, which, for convenience, may be contiguous.

The eduction and induction pipes may be formed of thin sheet-iron, or of thick paper saturated with some of the many well-known and cheap compounds that render paper or even stiffened cotton cloth uninflammable.

The introduction of pipes to communicate with apartments does not impair the draft of chimneys or shafts, because ample area or space can be left for the smoke to ascend and pass off outside of the uptake-pipe, and the heat from the fire producing the smoke, as it rarefies the air in the uptake, aids its own escape, and increases the current of foul air through the passage G. (Represented in Fig. 2.) This is effected on the well-known principles of rarefaction—that is, the foul air, as it comes in contact with the sides of the uptake-pipe, loses its density and ascends more rapidly, and passes off through the aperture M, formed by the disk C. The smoke outside of the uptake passes off through the same aperture M by the passages N at or near the top, as shown in the drawings. It will readily be seen that the uptake or exit for the smoke and foul air never closes, and the area is always the same.

The rotary motion to the ventilator is produced by the vane Z, acted upon by the wind, and keeps the wings or arms $b$ in position to catch the current.

To prevent rain or snow from passing down the induction-pipe, I place the strips m at convenient points, and at any angle, so that the rain that strikes them may fall or drip off; and to prevent its being driven or carried down the pipe, I place the L-shaped stop O; and to shed the rain completely, I place my ventilator on a conical cap, which fits on the brick-work or masonry. The ventilator is prevented from being blown off by violent winds by the holding-down pieces x x x x, bolted or otherwise secured to the plate Q.

Having thus described my invention, what I desire to secure by Letters Patent is—

1. A ventilating apparatus consisting of a vertical air-pipe extending above the building, and having a movable top provided with a vane to hold it properly to the wind, in combination with air receiving and discharging openings above the building, connected by independent pipes to the apartments to be ventilated, substantially as described.

2. The combination of the parts A G R Z with the pipes communicating from A and G, respectively, to the parts to be ventilated, substantially as described.

3. The combination of the conical cover D with the parts A G R Z and the connecting air-pipes, substantially as described.

4. The combination of the disk C, provided with the aperture M, with the pipe A, having wings b b, and the outer pipe G, substantially as described.

5. The L-shaped stop O, mounted on the disk C, in combination with the induction-opening, substantially as described, for the purpose specified.

CHARLES L. GARFIELD.

Witnesses:
   JUAN PATTISON,
   THOS. M. TREGO.